United States Patent [19]
Kido

[11] Patent Number: 4,899,239
[45] Date of Patent: Feb. 6, 1990

[54] AUTO-REVERSE TAPE RECORDER OF THE HEAD TURNING OVER TYPE

[75] Inventor: Kunio Kido, Wako, Japan
[73] Assignee: Tanashin Denki Co., Ltd., Tokyo, Japan
[21] Appl. No.: 99,604
[22] Filed: Sep. 22, 1987

[30] Foreign Application Priority Data

Mar. 3, 1987 [JP] Japan .................................... 62-46763

[51] Int. Cl.$^4$ ............................................... G11B 5/55
[52] U.S. Cl. ................................................... 360/106
[58] Field of Search .................... 360/106, 105, 130.21, 360/74.1, 109, 129

[56] References Cited

U.S. PATENT DOCUMENTS

| | | | |
|---|---|---|---|
| 3,936,884 | 2/1976 | Hogan | 360/129 |
| 4,510,543 | 4/1985 | Ohta et al. | 360/106 |
| 4,672,492 | 6/1987 | Muramatsu | 360/105 X |

FOREIGN PATENT DOCUMENTS

| | | | |
|---|---|---|---|
| 0185018 | 10/1984 | Japan | 360/106 |
| 0022414 | 1/1986 | Japan | 360/106 |
| 0170920 | 8/1986 | Japan | 360/106 |
| 2086642 | 5/1982 | United Kingdom | |

Primary Examiner—A. J. Heinz
Assistant Examiner—David J. Severin
Attorney, Agent, or Firm—Wegner & Bretschneider

[57] ABSTRACT

A tape recorder of the automatic reversing type which can attain reduction in time required and simplification in structure for turning over of a magnetic head and wherein possible dislocation of a magnetic head which is apt to readily appear where a head turning over system is employed can be prevented assuredly. The tape recorder comprises a head mount and a magnetic head structure mounted for rotation around an axis in the head mount and including a magnetic head. Each time the feeding direction of the tape is to be reversed, the magnetic head structure is rotated by an angle of 180 degrees to turn over the magnetic head from one to another track of a tape in a tape cassette loaded in position in the tape recorder with the magnetic head held in contact with the tape. A pair of fixed tape guides for contacting with the tape to inhibit lateral widthwise movement of the tape are secured at opposite positions of the head mount with respect to the magnetic head.

9 Claims, 2 Drawing Sheets

AUTO-REVERSE TAPE RECORDER OF THE HEAD TURNING OVER TYPE

BACKGROUND OF THE INVENTION

1. Field of the Invention

This invention relates to a tape recorder of the automatic reversing type wherein a magnetic head is turned over from a position opposing to a track of a magnetic tape to another position opposing to another track of the magnetic tape or vice versa each time an end of the tape arrives.

2. Description of the Prior Art

A tape recorder of the automatic reversing type normally includes a pair of capstan shafts, a pair of pinch rollers and a pair of reel shafts which are all located in a symmetrical relationship with respect to a magnetic head. In such a tape recorder, both of the capstan shafts and an alternative one of the reel shafts are driven to rotate while one of the pinch rollers which is then located on the same side with the currently driven reel shaft is contacted with the corresponding capstan shaft with a magnetic tape interposed therebetween in order to feed the tape in one direction. Then, when the tape is wound until an end thereof is reached, this is detected, for example, mechanically, to change over the relationship of driving of the reel shafts and contacting of the pinch rollers with the capstan shafts in order to automatically reverse the feeding direction of the tape.

By the way, one of such tape recorders of the automatic reversing type as described above is called a head turning over type wherein a magnetic head having a magnetic gap or gaps smaller in number than tracks of a magnetic tape is employed and is turned by an angle of 180 degrees around an axis of rotation thereof each time an end of a magnetic tape arrives. Tape recorders of the head turning over type normally have such a construction that a tape guide is mounted on a side face of a magnetic head, and when an end of a tape is detected, the magnetic head and the tape guide are first retracted externally of a tape cassette loaded in position in the tape recorder and are then turned by an angle of 180 degrees around an axis of rotation in an integral relationship with each other whereafter they are advanced into the tape cassette in an integral relationship.

However, in order to turn over a magnetic head in a tape recorder of the automatic reversing type wherein such a head turning over system is employed, the magnetic head is required to make three different actions including retracting movement in a direction of an axis of rotation thereof, rotating movement around the axis, and advancing movement in the opposite axial direction. Consequently, much time is required for a turning over operation of the magnetic head. This raises not only a problem that an interruption in time will appear upon recording or reproduction but another problem that a mechanism for turning over the magnetic head is complicated.

SUMMARY OF THE INVENTION

It is an object of the present invention to provide a tape recorder of the automatic reversing type which can attain reduction in time required and simplification in structure for turning over of a magnetic head.

It is another object of the present invention to provide a tape recorder of the automatic reversing type wherein possible dislocation of a magnetic head which is apt to readily appear where a head turning over system is employed can be prevented assuredly.

In order to attain the objects, according to one aspect of the present invention, there is provided a tape recorder of the automatic reversing type which comprises a head mount, a magnetic head structure including a magnetic head, means on the head mount for mounting the magnetic head for rotation around an axis at a substantially fixed position on the head mount, the head mount being mounted for movement between an inoperative position and an operative position in which at least part of the magnetic head structure is received in a tape cassette loaded in position in the tape recorder and the magnetic head contacts with a tape in the tape cassette in order to effect recording or reproduction of the tape, a pair of fixed tape guides secured to the head mount for contacting, at opposite positions with respect to the magnetic head, with the tape to inhibit lateral widthwise movement of the tape when the head mount is in its operative position, and a head turning over mechanism operable in response to a tape feeding direction reversing signal for rotating the magnetic head structure substantially by an angle of 180 degrees around its axis of rotation with the magnetic head held in contact with the tape in order to allow the magnetic head to subsequently record on or reproduce from the tape during subsequent feeding of the tape in the reverse direction.

Since the tape guides are located stationarily at opposite positions with respect to the magnetic head in a separate relationship from the magnetic head mounted for rotation around the axis of the magnetic head structure, the magnetic head can be turned over without being influenced by the tape guides while the magnetic head remains inserted in the tape cassette. Thus, each time the feeding direction of a tape is to be reversed, the magnetic head is turned over by a single action of the same. Accordingly, reduction in time required and simplification in structure for turning over of the magnetic head can be attained. Besides, possible dislocation of the magnetic head which is apt to readily appear where a head turning over system is employed can be prevented assuredly.

According to another aspect of the present invention, there is provided a tape recorder of the automatic reversing type which comprises a head plate mounted for movement toward and away from a tape cassette loaded in Position in the tape recorder, a head mount mounted on the head plate and having a head insertion hole formed therein which extends in a direction toward the tape cassette loaded in position, the head mount having a first tapered face formed around a portion of the head insertion hole adjacent the tape cassette, a magnetic head structure including a magnetic head and having a second tapered face formed at a portion thereof near a tape contacting face thereof at which the magnetic head is to contact with a tape in the tape cassette, the magnetic head structure being mounted for rotation around an axis in the head insertion hole of the head mount with the second tapered face thereof face-contacted with the first tapered face of the head mount, a spring for urging the magnetic head structure toward the tape cassette so as to establish a face contacting relationship between the first and second tapered faces, a pair of fixed tape guides secured to the head mount for contacting, at opposite positions with respect to the magnetic head, with the tape to inhibit lateral widthwise movement of the tape, and a head turning over mechanism operable in response to a tape feeding direction reversing signal for rotating the magnetic head structure by an angle of 180 degrees around its axis of rotation with the magnetic head held in contact with the tape in order to allow the magnetic head to subsequently record on or reproduce from the tape during subsequent feeding of the tape in the reverse direction.

Also with the construction, similar functions can be attained. In addition, since the first tapered face of the head insertion hole is face-contacted with the second tapered face formed at the portion of the magnetic head structure near the tape contacting face and besides the spring for urging the magnetic head structure toward the cassette loading section is provided, a mutual positioning action between and by the tapered faces can be anticipated and the supporting fulcrum for the magnetic head structure can be set sufficiently near to the magnetic tape. Accordingly, even if some deflection of the axis should appear at the magnetic head structure, the amount of dislocation of the magnetic gap of the magnetic head can be minimized, According to a further aspect of the present invention, there is provided a tape recorder of the automatic reversing type which comprises a head mount, a magnetic head structure including a magnetic head, mounting means on the head mount for mounting the magnetic head for rotation around an axis at a substantially fixed position on the head mount, the head mount being mounted for movement between an inoperative position and an operative position in which the magnetic head contacts with a tape in a tape cassette loaded in position in the tape recorder in order to effect recording or reproduction of the tape, a member having a pair of different positions corresponding to feeding directions of the tape, and connecting means operatively connecting the member to the magnetic head structure for rotating the magnetic head structure substantially by an angle of 180 degrees around its axis of rotation with the magnetic head held in contact with the tape when the member is moved from one to the other of the positions or vice versa.

According to a still further aspect of the present invention, there is provided a tape recorder of the automatic reversing type which comprises a head mount having an inner bore formed therein, a magnetic head structure accommodated in the inner bore of the head mount, means for centering an end of the magnetic head structure adjacent a tape in a tape cassette loaded in position in the tape recorder with respect to the head mount, means on the head mount for supporting a portion of the magnetic head structure adjacent the other end thereof, the magnetic head structure being supported for rotation around a substantially fixed axis by the means for centering and the means for supporting, and means connected to another portion adjacent the other end of the head magnetic structure for rotating the magnetic head structure by an angle of 180 degrees around the fixed axis thereof.

The above and other objects, features and advantages of the present invention will become apparent from the following description and the appended claims, taken in conjunction with the accompanying drawings.

DESCRIPTION OF THE PREFERRED EMBODIMENTS

Figure 1:
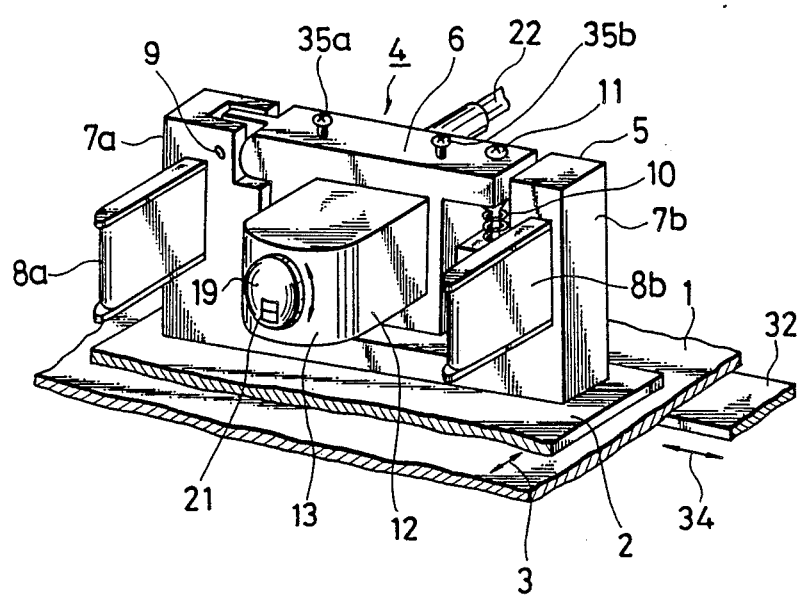
FIG. 1 is a perspective view showing part of a tape recorder of the automatic reversing type according to an embodiment of the present invention.

Referring first to FIG. 1, there is shown a tape recorder of the automatic reversing type according to a preferred embodiment of the present invention. The tape recorder of the embodiment is only different in mechanical construction around a magnetic head from a conventional tape recorder of the similar type, and in FIG. 1, only a structure around the magnetic head is shown while the remaining part of the tape recorder which does not directly relate to the present invention is omitted.

The tape recorder shown includes a chassis 1, and a head plate 2 mounted on an upper face of the chassis 1 for movement in directions as indicated by a double-sided arrow mark 3 in FIG. 1 between an inoperative position and an advanced operative position in which a magnetic head 21 which will be hereinafter described contacts with a magnetic tape in a tape cassette not shown loaded in position in a cassette loading section not shown of the tape recorder in order to effect recording or reproduction of the tape. As either a recording or a reproducing operating button not shown is manually pushed into its actuated position, the head plate 2 is advanced toward the cassette loading section and is thereafter arrested at its actuated position by a suitable arresting means not shown, but when a stopping operating button not shown is manually pushed into its actuated position, the head plate 2 is released from the arresting means and is automatically retracted to its inoperative home position by a mechanism not shown.

A head mount 4 is secured to an upper face of the head plate 2 in an opposing relationship to the cassette loading section so that as the head plate 2 is moved between the inoperative and operative positions thereof, the head mount 4 is also moved between inoperative and operative positions thereof. The head mount 4 includes a fixed base member 5 having a channel-shaped front elevation and having a horizontal portion thereof secured to the head plate 2, and a movable base member 6 located in the central spacing in the fixed base member 5. A pair of end extensions 7a, 7b extend uprightly from opposite ends of the horizontal portion of the fixed base member 5, and a pair of projected tape guides 8a, 8b are formed on front faces of the end extensions 7a, 7b of the fixed base member 5 opposing to the cassette loading section and extend in parallel to each other in a horizontal direction toward the cassette loading section. The tape guides 8a, 8b receive therein, when the head plate 2 is advanced, a tape in a tape cassette loaded in position in the tape cassette loading section and restrain lateral widthwise movement of the tape. Meanwhile, the movable base member 6 is supported at an end thereof for pivotal motion on the end upright extension 7a of the fixed base member 5 by means of a pin 9 while the other end thereof is resiliently supported on the other end upright extension 7b of the fixed base member 5 by means of a compression spring 10 and a screw 11. Accordingly, the movable base member 6 can be adjusted in a widthwise direction of the tape by adjusting the screw 11.

Figure 2:
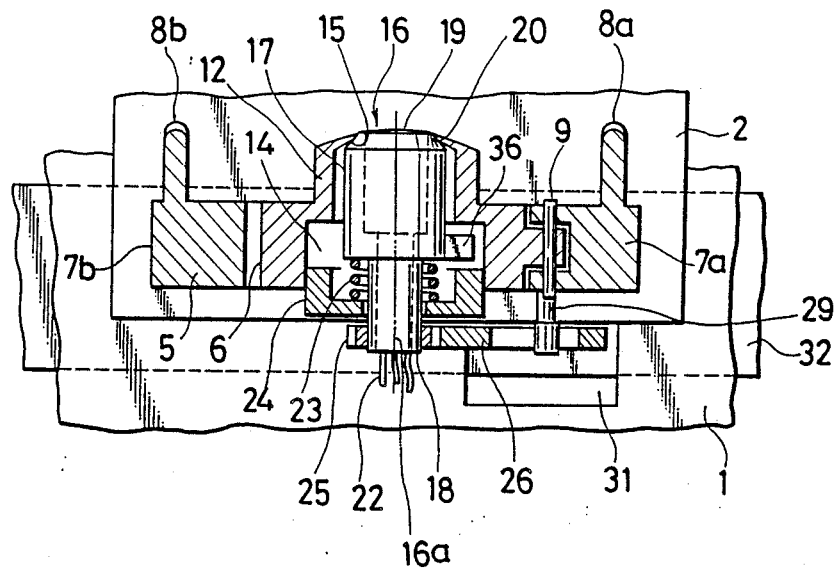
FIG. 2 is a partial horizontal sectional view of the tape recorder of FIG. 1.

A projection 12 in the form of an angular post is formed in an integral relationship on a front face of the movable base member 6 opposing to the cassette loading section and extends in a horizontal direction toward the tape cassette loading section. The dimension of the projection 12 in the up and down directions in FIG. 1 is selected so as to allow the projection 12 to advance into a head insertion hole not shown formed in a tape cassette, and the terminal end 13 of the projection 12 is shaped so as to have a rounded face of a predetermined radius of curvature in plan. Referring to FIG. 2, a head insertion hole 14 is formed in the projection 12 and a main body portion of the movable base member 6 with an axis thereof directed toward the tape cassette loading section. The insertion hole 14 is formed as a stepped hole so as to Present three different inner diameters which are reduced in magnitude toward the end of the projection 12. The inner peripheral face of the projection 12 at the minimum diameter portion of the insertion hole 14 nearest to the end of the projection 12 is tapered so as to provide a tapered face 15 which reduces in diameter toward the tape cassette loading section.

A magnetic head structure 16 is accommodated for rotation in the head insertion hole 14 of the movable base member 6. As particularly seen in FIG. 2, the magnetic head structure 16 includes a head holder 17 in the form of a column of a smaller axial length which has a greater diameter than the minimum diameter portion of the insertion hole 14, that is, a greater diameter than the portion of the insertion hole 14 around which the tapered face 15 is formed, so that the head holder 17 may be retained in the movable base member 6. A tubular member 18 is either connected or formed at a rear end thereof in an integral coaxial relationship with the head holder 17 while a trapezoidal portion is formed at the other front end portion of the head holder 17 and presents a conical or inclined tapered face 20 for face-contacting with the aforementioned tapered face 15 of the projection 12 of the movable base member 6. The front end face 19 of the head holder 17 forwardly of the tapered face 20 is rounded and exposed forwardly outside through an opening of the head insertion hole 14 near the cassette loading section as shown in FIG. 1. A magnetic head 21 is mounted in the head holder 17 of the magnetic head structure 16 and located, particularly at the magnetic gap or gaps thereof, at an eccentric position on the rounded end face 19 of the head holder 17, and lead wires 22 are connected to the magnetic head 21 and led out through the tubular member 18 for external connection.

In assembling the magnetic head structure 16 having such a construction as described above, it is first inserted into the head insertion hole 14 of the movable base member 6 with the head holder 17 thereof directed toward the cassette loading section, and a compression coil spring 23 is mounted around the tubular member 18. Then, a retaining ring 24 having a hole formed therein ia fitted around a portion of the tubular member 18 behind the coil spring 23 and is secured to the movable base member 6 with a slight gap left between the retaining ring 24 and the tubular member 18, thereby completing mounting of the magnetic head structure 16 in the head insertion hole 14. Thus, when the magnetic head structure 16 is mounted in the head insertion hole 14, the magnetic head structure 16 is in face-contact at the tapered face 20 thereof with the tapered face 15 of the projection 12 of the movable base member 6 under a suitable contacting pressure provided by the compression coil spring 23. Accordingly, if a turning force is applied to the tubular member 18 from outside, the magnetic head structure 16 will be rotated around a horizontal axis 16a thereof which extends in parallel to a direction of movement of the head mount 4 and substantially coincides with the axis or center line of the head insertion hole 14 of the movable base member 6. It is to be noted that the axis 16a of rotation of the magnetic head structure 16 passes the center of the width of a tape in a tape cassette loaded in position in the cassette loading section of the tape recorder.

Figure 3:
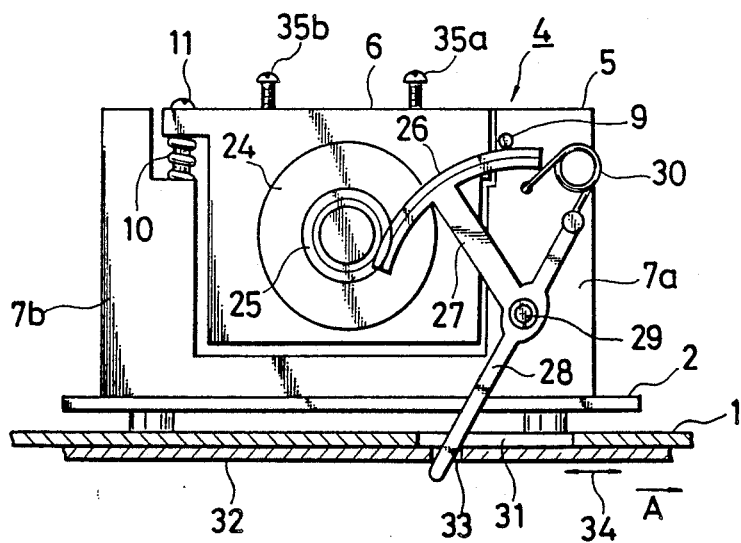
FIG. 3 is a partial rear elevational view of the tape recorder of FIG. 1.

Referring to FIGS. 2 and 3, a small gear 25 is secured to a rear end portion of the tubular member 18 which extends outwardly from the retaining ring 24. The small gear 25 is held in meshing engagement with a sector gear 26 as shown in FIG. 3. An arm 27 of the sector gear 26 is connected in an integral relationship to a lever 28 and the connecting portion between the lever 28 and the arm 27 is supported for pivotal motion on a shaft 29 located on a rear face of the fixed base member 5. A torsion toggle spring 30 extends between an end of the lever 28 and the fixed base member 5 while the other end of the lever 28 extends through a window 31 formed in the chassis 1 and is received in a hole 33 formed in a change-over operating plate 32. The hole 33 is elongated in a direction parallel to the direction of movement of the head plate 2 or to the axis 16a of rotation of the magnetic head structure 16 so that the lever 28 may not interfere with the change-over operating plate 32 when the head plate 2 is advanced to its operative position. The change-over operating plate 32 is mounted for movement along the chassis 1 and is shifted in a controlled amount in either direction as indicated by a double-sided arrow mark 34 in FIGS. 1 and 3 between two shift positions each time the feeding direction of a tape is to be changed over. In particular, the change-over operating plate 32 is connected to a tape end detecting mechanism not shown which mechanically detects an end of a tape each time the tape comes to its end as in a known tape end detecting mechanism and also connected to a manually operable tape feeding direction reversing button or a pair of manually operable tape feeding direction selecting buttons such that, when the tape end detecting mechanism operates or when the tape feeding direction reversing button or one of the tape feeding direction selecting buttons is manually operated, the change-over operating plate 32 may be shifted from one to the other of the two positions or vice versa in accordance with the direction in which the tape is to be subsequently fed. Thus, the two shift positions of the change-over operating plate 32 correspond to and indicate the feeding directions of a tape.

The tape recorder shown further includes a pair of azimuth adjusting screws 35a, 35b (FIGS. 1 and 3) mounted for engagement with a projection 36 (FIG. 2) on the magnetic head structure 16.

With such a construction as described above, if either the recording operating button or the reproducing operating button is manually pushed in to advance the head plate 2 to its actuated position, an end portion of the magnetic head structure 16 and end portions of the tape guides 8a, 8b are advanced and admitted into the tape cassette. Consequently, the magnetic head 21 is brought into contact, at the rounded end face 19 thereof, with, for example, a forward side track of a tape within the tape cassette while the tape guides 8a, 8b are engaged with and thus inhibit movement of the tape in a widthwise direction. At the same time, one of a pair of pinch rollers not shown is contacted with a corresponding capstan not shown so that the tape may be fed in one direction by the capstan in order to effect recording or reproduction. Then when a tape end arrives and the tape end detecting mechanism detects this, or else when the tape feeding direction reversing button or one of the tape feeding direction selecting buttons is manually operated, the change-over operating Plate 32 is shifted in either direction to the other shift position in response to such a mechanical tape feeding direction reversing signal applied thereto. In such a case as shown in FIG. 3, the change-over operating plate 32 is shifted in a direction indicated by an arrow mark A in FIG. 3. As the change-over operating plate 32 is shifted in this manner, the lever 28 is pivoted to angularly rotate the sector gear 26 in the counterclockwise direction around the shaft 29. Now, if it is assumed that the length of the lever 27 and the length of the arm 28 from its pivotal point 29 to the hole 33 are designed optimally, the magnetic head structure 16 will be rotated by an angle of 180 degrees each time the change-over operating plate 32 is shifted. Therefore, the magnetic head 21 will be brought into contact with a reverse side track of the tape while it is held in contact with the tape. Upon such rotation of the magnetic head structure 16 by 180 degrees, the torsion 30 is first distorted accumulating an urging force therein, but then when the arm 28 is pivoted beyond an intermediate neutral line interconnecting the center of pivotal motion of the arm 28, that is, the shaft 29, and the fixed end of the torsion spring 30, the torsion spring 30 now urges the arm 28 and the sector gear 26 in the same direction to rapidly move magnetic head structure 16 to the aimed position. Thus, a head turning over mechanism is constituted by the change-over operating plate 32, arm 28, lever 27, sector gear 26 and small gear 25. As the change-over operating plate 32 is shifted in this manner, the aforementioned one pinch roller is brought out of contact with the corresponding capstan while the other pinch roller is brought into contact with its corresponding capstan. As a result, the tape will now be fed in the opposite direction, completing an automatic reversing operation.

In this instance, since the tape guides 8a, 8b are secured to the fixed base member 5 of the head mount 4 in a completely separated relationship from the magnetic head 21, there is no influence of the tape guides 8a, 8b on rotation of the magnetic head structure 16. Accordingly, the magnetic head 21 can be rotated by an angle of 180 degrees around its axis 16a of rotation within the tape cassette without moving the magnetic head 21 in a direction of the axis 16a of rotation thereof. In other words, the magnetic head 21 can be rotated by an angle of 180 degrees by a single action of the same. Accordingly, reduction in weight and also in time required for rotation of the rotatable part and simplification of a mechanism for rotating the rotatable part can be realized. Further, it is made possible to adjust the vertical position of the magnetic head 21 independently of the tape guides 8a, 8b.

Further, due to the construction wherein the magnetic head structure 16 is mounted in the head insertion hole 14 formed in the movable base member 6 and having the tapered face 15 formed at an inner face thereof near the tape cassette loading section such that the tapered face 20 formed at a portion near the tape contacting face 19 of the magnetic head structure 16 may face contact with the tapered face 15 of the head insertion hole 14 while a contacting pressure is applied to the magnetic head structure 16 by the spring 23 in order to accommodate the magnetic head structure for rotation in the head insertion hole 14, the fulcrum of the magnetic head structure 16 can be set to a position very near to a contacting position between the tapered face 15 of the head insertion hole 14 and the tapered face 20 of the magnetic head structure 16, that is, to a position very near to the tape. Consequently, even if some deflection of the axis 16a of rotation of the magnetic head structure 16 should appear, dislocation of the magnetic head 21 can be minimized, and accordingly deterioration of the acoustic characteristic which readily occurs where a turn-over type magnetic head is employed can be prevented. Further, since dislocation of the magnetic head 21 can be controlled due to the same reason as described above, there is no trouble if the axial length of the magnetic head structure 16 is reduced, and accordingly the rotatable part can be further reduced in size.

It is to be noted that while in the foregoing description of the preferred embodiment the magnetic head 21 is mounted in the head holder 17 of the magnetic head structure 16, the magnetic head structure 16 may otherwise be constituted from the magnetic head 21 by itself. In such a case, the magnetic head 21 will be rotated by an angle of 180 degrees around its axis (16a) of rotation to bring its magnetic gap or gaps to a position or positions opposing to a reverse track or tracks of a tape. Further, while the magnetic head 21 is described as a recording/reproducing head, it may otherwise be an erasing head or else be replaced by a combination of a recording/reproducing head or heads with an erasing head

Having now fully described the invention, it will be apparent to one of ordinary skill in the art that many changes and modifications can be made thereto without departing from the spirit and scope of the invention as set forth herein.

What is claimed is:

1. A tape recorder of the automatic reversing type, comprising a head mount, a magnetic head structure including a magnetic head, means on said head mount for mounting said magnetic head for rotation around an axis at a substantially fixed position on said head mount, said head mount being mounted for movement between an inoperative position and an operative position in which at least part of said magnetic head structure is received in a tape cassette loaded in position in said tape recorder and said magnetic head contacts with a tape in the tape cassette in order to effect recording or reproduction of the tape, a pair of fixed tape guides secured to said head mount for contacting, at opposite positions within respect to said magnetic head, with the tape to inhibit lateral widthwise movement of the tape w hen said head mount is in its operative position, and a head turning over mechanism operable in response to a tape feeding direction reversing signal for rotating said magnetic head structure substantially by an angle of 180° degrees around its axis of rotation with said magnetic head held in contact with the tape in order to allow said magnetic head to subsequently record on or reproduce from the tape during subsequent feeding of the tape in the reverse direction, wherein said head mount includes a fixed base member secured to a head plate which is mounted for movement toward and away from the tap cassette loaded in position, said magnetic head structure being coupled to said fixed base member, said head mount further including a movable base member mounted on said fixed base member in such a manner as to allow adjustment of the position of said movable base member in a lateral widthwise direction of the tape.

2. A tape recorder of the automatic reversing type as claimed in claim 1, wherein said fixed tape guides are mounted on said fixed base member.

3. A tape recorder of the automatic reversing type as claimed in claim 1, wherein said head turning over mechanism includes a reciprocally movable change-over operating plate for receiving a tape feeding direction receiving signal to move from a first position to a second position or vice versa, and a converting mechanism for converting a motion of said change-over operating plate into a rotational motion of said magnetic head structure.

4. A tape recorder of the automatic reversing type as claimed in claim 3, wherein said converting mechanism includes a sector gear connected for rotation by said change-over operating plate, and a small gear mounted in a concentrical relationship with the axis of rotation of said magnetic head and in meshing engagement with said sector gear.

5. A tape recorder of the automatic reversing type, comprising a head plate mounted for movement toward and away from a tape cassette loaded in position in said tape recorder, a head mount mounted on said head plate and having a head insertion hole formed therein which extends in a direction toward the tape cassette loaded in position, said head mount having a first tapered face formed around a portion of said head insertion hole adjacent the tape cassette, a magnetic head structure including a magnetic head and having a second tapered face formed at a portion thereof near a tape contacting face thereof at which said magnetic head is to contact with a tape in the tape cassette, said magnetic head structure being mounted for rotation around an axis in said head insertion hole of said head mount with said second tapered face thereof face-contacted with said first tapered face of said head mount, a spring for urging said magnetic head structure toward the tape cassette so as to establish a face contacting relationship between said first and second tapered faces, a pair of fixed tape guides secured to said head mount for contacting, at opposite positions with respect to said magnetic head, with the tape to inhibit lateral widthwise movement of the tape, and a head turning over mechanism operable in response to a tape feeding direction reversing signal for rotating said magnetic head structure by an angle of 180 degrees around its axis of rotation with said magnetic head held in contact with the tape in order to allow said magnetic head to subsequently record on or reproduce from the tape during subsequent feeding of the tape in the reverse direction.

6. A tape recorder of the automatic reversing type as claimed in claim 5, wherein said head mount includes a fixed base member secured to said head plate, and a movable base member mounted on said fixed base member in such a manner as to allow adjustment of the position of said movable base member in a lateral widthwise direction of the tape, said head insertion hole being formed in said movable base member.

7. A tape recorder of the automatic reversing type as claimed in claim 5, wherein said magnetic head structure includes a rotatable member carrying said magnetic head thereon and mounted for rotation on said head mount, said second tapered face being formed on said rotatable member.

8. A tape recorder of the automatic reversing type, comprising a head mount having an inner bore formed therein, a magnetic head structure accommodated in said inner bore of said head mount, means for centering an end of said magnetic head structure adjacent a tape in a tape cassette loaded in position in said tape recorder with respect to said head mount, means on said head mount for supporting a portion of said magnetic head structure adjacent the other end thereof, said magnetic head structure being supported for rotation around a substantially fixed axis by said means for centering and said means for supporting, and means connected to another portion adjacent the other end of said head magnetic structure for rotating said magnetic head structure by an angle of 180 degrees around the fixed axis thereof,
wherein said means for centering includes an inner annular tapered face formed at a portion of said inner bore of said head mount adjacent the tape in the tape cassette, an outer annular tapered face formed at the portion adjacent the other end of said magnetic head structure for face-contacting with said inner annular tapered face of said head mount, and means for urging said magnetic head structure in a direction to establish a face-contacting relationship between said outer and inner annular tapered faces of said magnetic head structure and said head mount.

9. A tape recorder of the automatic reversing type as claimed in claim 8, wherein said means for urging is a compression coil spring accommodated in said inner bore of said head mount and fitted around a reduced diameter portion of said magnetic head structure.

* * * * *